Figure 1:
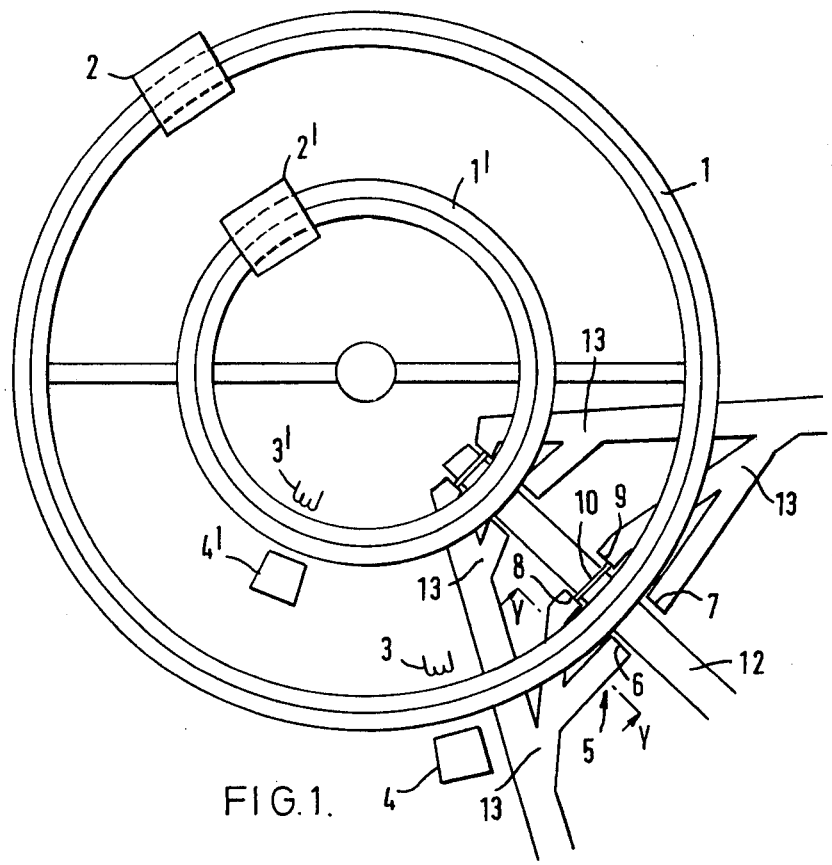

United States Patent [19]

Loose et al.

[11] 4,031,821
[45] June 28, 1977

[54] FOOD PROCESSING MACHINERY

[75] Inventors: Peter William Loose; Martyn Ridley Tamkin, both of Chelmsford, England

[73] Assignee: Gardenia Limited, St. Peter's Port, Guernsey, Guernsey (Channel Is.)

[22] Filed: Apr. 21, 1976

[21] Appl. No.: 678,801

[30] Foreign Application Priority Data

Apr. 29, 1975 United Kingdom ............ 17819/75

[52] U.S. Cl. .................................... 99/643; 99/637
[51] Int. Cl.² .......................................... A23N 15/02
[58] Field of Search ............ 99/637, 636, 642, 643, 99/491, 493; 171/26, 31; 209/111.7

[56] References Cited

UNITED STATES PATENTS

| | | | |
|---|---|---|---|
| 3,307,599 | 3/1967 | Vacca | 99/643 |
| 3,367,477 | 2/1968 | Leth | 99/643 X |
| 3,389,731 | 6/1968 | Teigen | 99/637 |
| 3,601,171 | 8/1971 | Farrow | 99/637 |
| 3,845,703 | 11/1974 | Gillespie | 99/643 |

Primary Examiner—Edward J. McCarthy
Attorney, Agent, or Firm—J. Rodman Steele, Jr.

[57] ABSTRACT

A machine for cutting off the heads of carrots in which the beginning of a carrot and its direction of taper are sensed electro-optically as it is carried by a conveyor and the time of operation of a cutter associated with the conveyor is controlled accordingly.

10 Claims, 4 Drawing Figures

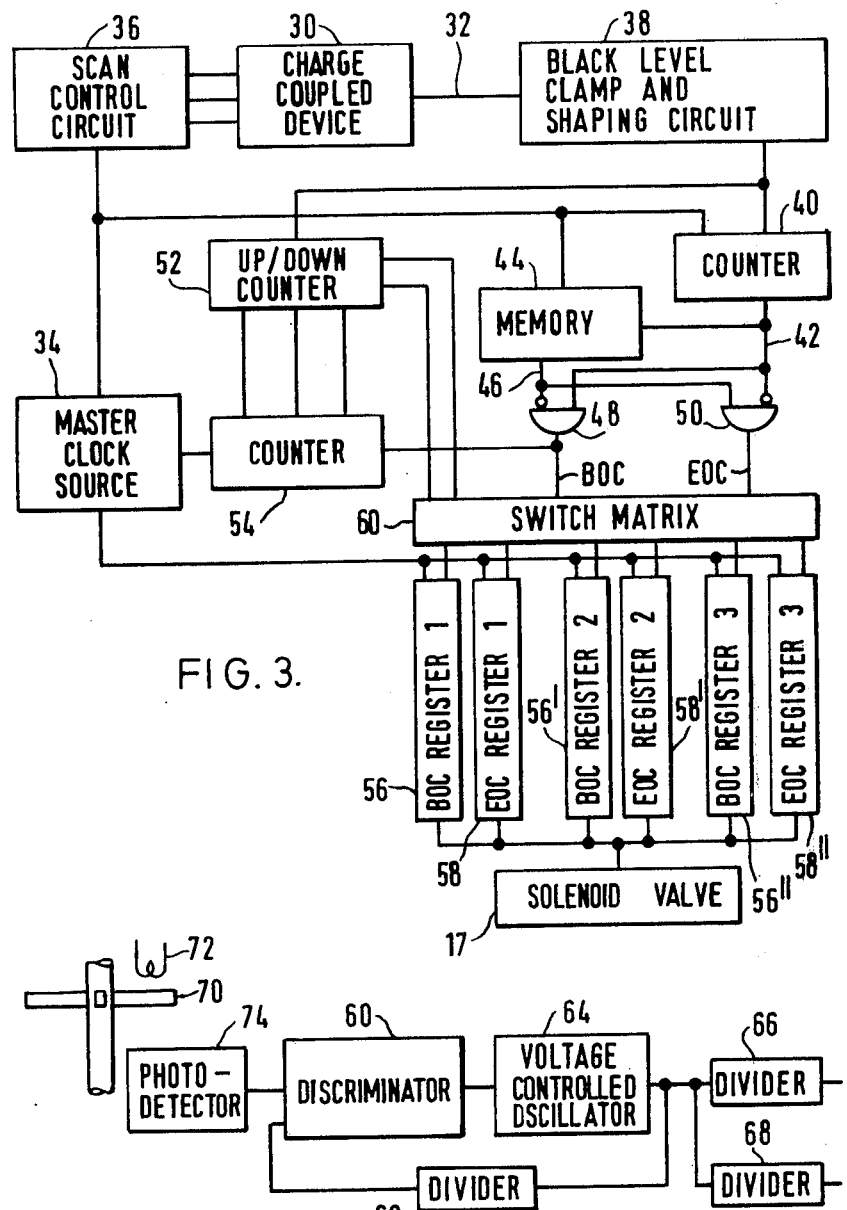

FOOD PROCESSING MACHINERY

The present invention relates to a machine, for use in a carrot canning process, to cut off the unpalatable head portion of each carrot from the remainder of the body.

It is clearly advantageous to be able, in canning carrots, to avoid the use of human labour in removing the heads. Hitherto, attempts at automating this step have involved some form of mechanical manipulation of the carrots such as to position the carrots with the same orientation on a conveyor. The latter conveyor carries the carrots past a cutting station which removes some predetermined amount of what is assumed to be the head of each carrot.

Several disadvantages are inherent in such mechanical systems. Apart from unreliability caused by wear in moving parts, there arises a problem whenever the taper on a carrot is not pronounced, because the sensitivity of mechanical sensing arrangements is severely limited. Furthermore, the step of ensuring correct orientation of each carrot is inefficient, being wasteful of effort and of space.

An object of the invention is to improve the efficiency of the carrot processing machine by detecting the direction of taper electro-optically.

In accordance with the invention, in a machine for cutting off the heads of carrots which comprises a cutting station, a conveyor for carrying carrots with random head first or tail first orientation to the cutting station and apparatus operative to sense the orientation of each carrot for controlling the cutting station such as to remove the head of the carrot, there is provided the improvement wherein said apparatus operative to sense the direction of orientation of each carrot comprises light sensitive means, a light source for projecting an image of the object on the light sensitive means, means for detecting the leading and trailing edge of each carrot, a circuit connected to the light sensitive means for producing an electrical output signal representative of the proportion of the area of the light sensitive means occupied by the image of the object and means for determining the sense of variation in said electrical output signal as the object is moved past the light sensitive means by the conveyor.

The term "image" is intended to include the case where a shadow of the object falls on the light sensitive means.

The cutting station preferably includes two cutters spaced along the direction of motion of the conveyor, one being operative when the end to be cut is at the leading edge and the other when the trailing edge is to be cut such that the same portion of the carrot, that is the waste head portion or the required body portion, is always pushed off the conveyor in between the two cutters.

Separate chutes may then conveniently convey the portions of the carrots, emitted from between the cutters, preferably the heads, to a first location and the other portions, emitted from the other sides of the cutters, to a second location thereby enabling the waste head material to be separated from the bodies to be canned.

Whilst the proportion of the light sensitive means occupied by the image may be determined by detecting the magnitude of the current flowing through a single photo-sensitive device, for example a photo-diode in a further development of the invention the light sensitive means consist of a plurality of discrete photo-sensitive elements, the proportion of the area of the light sensitive means exposed to light being indicated by the number of energized photo-sensitive elements.

Conveniently, when the image is a shadow, a scanning circuit is arranged repeatedly to sample sequentially the outputs of the photo-sensitive elements and to count the number of energized elements in each scan starting from a predetermined end and finishing upon reaching a non-energized element, the count being indicative of the proportion of the light sensitive means not shadowed by the object.

In order to determine the sense of variation in the count, one may conveniently add the counts produced on the first, third and remaining odd numbered scans and subtract from this calaculation the counts on even numbered scans. In this way, one may determine the sense of taper by whether the total obtained has a positive or negative sign.

Because the head of a carrot is rounded, the initial taper is of the opposite sense to the remainder of the body. To reduce the chance of incorrect assessment of the taper of the carrot, it is preferable to ignore, for the purpose of taper detection, the portions of each carrot a predetermined distance from each end, say the first and last 0.25 inches of each carrot.

In the known mechanical technique for removing the heads from carrots, a further problem is caused by the fact that mechanical techniques were not capable of distinguishing the body of a carrot from the green shoot that grows above ground. This problem may be overcome if the leading edge of a carrot is taken to be the line when first a point immediately above the conveyor casts a shadow on the light sensitive means. Because the green shoot grows centrally in the carrot, light may pass under the shoot at the point where it joins the head when the carrot is resting on the conveyor and thus the lowermost photo-sensitive element would be illuminated. To avoid incorrect detection of the leading edge, counting will only commence to assess the taper of the carrot 0.25 inches after the body of the carrot has obstructed the light falling on the lowermost photo-sensitive element.

It is necessary, having detected the point on a carrot at which cutting should take place, to know when the point passes the appropriate cutter. To achieve this, one not only needs to know the distance of the cutter from the photo-sensitive detectors but also the speed of movement of the conveyors. In the case of a conveyor constituted by the rim of a horizontal wheel, this may be realised by controlling a master clock source such that a fixed number of clock pulses are emitted by it in each revolution of the wheel. In this manner one may determine the position of a carrot relative to a cutter by sensing the number of clock pulses emitted after detection of an edge of a carrot.

Figure 2:
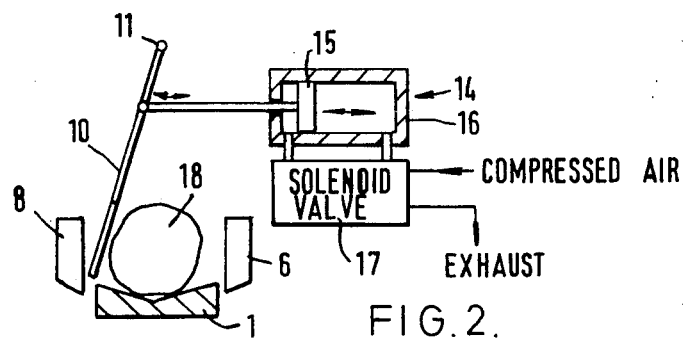

In operation, upon detection of each edge of a carrot a respective one of two storage means is energised to produce an output signal after a respective predetermined number of clock pulses corresponding to the distance between the photo-sensitive detectors and the appropriate cutter in the cutting station. The invention will now be described further, by way of example, with reference to the accompanying drawings, in which:

FIG. 1 shows a plan view of a machine for removing heads from carrots,

FIG. 2 shows a section taken along the line Y—Y in FIG. 1 with the chute omitted and with a carrot placed on the conveyor, FIG. 3 shows a block schematic diagram of apparatus for determining the orientation of a carrot on a conveyor and actuating a cutter in the cutting station, and FIG. 4 shows a block schematic diagram of a circuit for synchronising a master clock source to the speed of movement of the conveyor. Referring to FIG. 1, a machine for removing heads from carrots comprises two conveyors 1, 1' each constituted by the rim of a horizontal wheel, the two wheels being concentric and rotatable about the same axis. Each of the conveyors 1, 1', passes under an associated feed hopper 2, 2' which loads carrots onto the conveyor. The rim of the wheel constituting each conveyor has a depression in the form of a flat V to prevent carrots being flung off the conveyor by centrifugal action.

The carrots placed on the conveyor pass a sensing arrangement constituted by a light source 3 and a light sensing arrangement 4 which determines the position of the leading and trailing edges of each carrot as well as the direction in which the carrot is pointing.

After leaving the sensing arrangement, each carrot passes a cutting station which is also shown in FIG. 2. The cutting station comprises a first pair of cutting blades 6 and 8 and, circumferentially staggered from these, a second set of cutting blades 7 and 9. Of these two pairs of blades only the pair 6,8 can be seen in FIG. 2. Arranged between the two pairs of blades is a paddle member 10 which is pivotable about an axis 11 directly above the centre of the conveyor and is swept across the path of the conveyor by a compressed air actuator 14 (see FIG. 2) comprising a double acting piston 15 arranged within a cylinder 16. Compressed air is fed alternately to the two sides of the double acting piston by means of a schematically represented solenoid valve 17 which reverses the connections of compressed air and exhaust to the actuator 14 each time it receives an electrical signal from the sensing arrangement. The paddle member thus has two stable positions arranged one on each side of the conveyor, in each position the paddle being located between one blade from each of the two pairs. When the solenoid valve 17 is energised the paddle member 10 sweeps across the conveyor to a similar position on the opposite side of the conveyor. In so doing, the paddle sweeps any carrot 18 (see FIG. 2) onto one cutter of one of two pairs thus removing the head. If the carrot is pointing tail first then the sensing arrangement actuates the paddle member 10 at the time when the point of severing is aligned with the blade 6. If, on the other hand, the carrot is oriented head first, then the paddle will be actuated when the point of severing is aligned with the blade 7. In either event the body of the carrot will come off the conveyor in between the two pairs of blades and fall into a chute 12 which leads to a canning station. The head portions will fall on the opposite sides of the blades into chutes 13 which lead to a hopper for waste material. When the next carrot is aligned with the cutting station, the paddle member will be located between the blades 6 and 7 and will be actuated to urge the carrot onto one or other of the blades 8 and 9 in a manner analogous to that already described. In this way, both movements of the paddle member result in cutting, obviating the need to reset the position of the paddle between strokes.

Alternatively, each cutter may have its own paddle member so that the relative position of the cutters may be altered and so that the heads rather than the bodies of the carrots should leave the conveyor in between the cutters.

A similar cutting station is associated with the conveyor 1' and since it is substantially identical with that already described no further description is believed necessary.

Reference will now be made to FIGS. 3 and 4 to illustrate the manner in which the solenoid valve 17 is controlled by the arrangement for sensing the position and orientation of the carrots on the conveyor.

The light from the source 3 falls upon a charge coupled device 30 which consists of an array of 256 photosensitive elements. Charge coupled devices are known per se and are somewhat analogous to a parallel input serial output shift register. By suitably modifying the potentials across the array one can transfer electrical charges from one location to the next and in this way arrange for the outputs of all 256 elements to appear in a time sequential manner on a single output lead 32. A master clock source 34 synchronised in a manner described below with the speed of rotation of the conveyor 1, produces a series of pulses which control the sequence of events throughout the logic circuitry. The pulses are applied to a scan control circuit 36 which upon receiving every clock pulse commences a scan of the light sensitive elements of the charge coupled device 30. When a carrot interrupts the light between the light source 3 and the charge coupled device 30 some of the elements will have no light falling upon them whilst others will remain illuminated. This is determined by the shape and size of the section of the carrot in line between the charge coupled device and the light source. With each clock pulse from the source 34, there therefore appears an output on line 32, termed a video output, which contains 256 bits which ideally should be at one or other of two levels determined by whether the corresponding light sensitive element in the charge coupled device 30 is illuminated or shadowed, It will be appreciated that the video output is the same as would be achieved by scanning a slot by means of a standard camera tube or a conventional array of photo-diodes or transistors which are sequentially scanned for example by a shift register. Whilst a change coupled device is preferred it is envisaged that other such scanning means may be employed instead.

The video output is applied to a circuit 38 which contains a black level clamp and suitable shaping circuits. The black level clamp is a circuit also known per se from television and other applications and has the effect of compensating the black level for variations in background illumination and changes in intensity of the light source 3. The shaping circuits convert the video analogue output into a digital two level output suitable for controlling the remainder of the circuitry involved, which operates digitally. During each scan controlled by the master clock source 34 a counter 40 counts the number of photo-sensitive elements which are shadowed by a carrot. The leading edge of a carrot is taken to be that point when for the first time the lowermost 32 photo-sensitive elements in the charge coupled device 30 are shadowed. The counter 40 commences counting at the beginning of each scan and counts all shadowed elements. Any bit from the circuit 38 corresponding to an illuminated element will reset the counter 40 which will restart counting with the next shadowed element. If a count of 32 is reached at the end of a scan then this indicates that a carrot is present. This condition is indicated by the level on an output line 42 of the counter 40. It is assumed that a logical 1 on this line corresponds to the presence of a carrot and a logical 0 corresponds to its absence. A memory 44 also connected to the master clock source 34 and which may, for example, be constituted by a J-K flip flop, registers the logical state of the signal on the line 42 on the preceding clock pulse so that at all times, the signal on an output line 46 of the memory 44 corresponds to the state on line 42 in the preceding scan by the charge coupled device 30. By definition, the beginning of a carrot is indicated by the first time that the presence of a carrot is detected, that is to say when there is a logical 1 on the line 42 and a logical 0 on the line 46. The signals on lines 42 and 46 are supplied to an AND gate 48 the signal on line 46 being inverted prior to its application. The inversion is represented, in the usual manner, by a small circle at the input to which the line 46 is connected. The AND gate 48 will thus produce an output at the beginning of each carrot and this signal will hereafter be referred to as the beginning of carrot (BOC) signal. The BOC signal will however only be treated as valid if the body of carrot continues to be detected for four consecutive scans. Likewise, the end of a carrot is indicated by a logical 1 on line 46 and a logical 0 on line 42. This condition is detected by an AND gate 50 having an inverting input connected to the line 42 and producing an end of carrot signal EOC. Again, to avoid errors caused by mis-shapen carrots the EOC signal is only treated as valid if no carrot is detected on four following scans. Summarizing, the blocks 40, 44, 48 and 50 are capable of producing signals when the beginning and the end of a carrot are detected but as yet it is not known whether the beginning is the head or the tail of a carrot.

The direction in which a carrot is pointing is determined by means of two counters 52 and 54. The principle involved in evaluating the direction of taper is to measure the number of illuminated photo-sensitive elements of the charge coupled device 30 during each scan. If the number of illuminated elements is increased then the carrot is head first whereas if the number of elements is steadily decreasing then the carrot is tail first. The counter 52 is controlled by the counter 54 to count up on the first scan, down on the second scan, up on the third scan and so on for an even number of scans dependent upon the carrot length. If the carrot is head first the number of illuminated elements in the second scan exceeds that in the first so that the net count at the end of two scans is negative. The same argument applies to the third and fourth scans so that provided one takes an even number of scans the count in the counter 52 would be negative if the carrot is head first and by a similar argument it will be realised that the count would be positive if the carrot is tail first. The control of the counter 52 is effected by the counter 54. The latter counter 54 is connected to the master clock source 34 and counts these pulses starting with the appearance of a BOC signal at the output of AND gate 48. After a predetermined count has been reached, this count corresponding to a displacement of the carrot by the conveyor exceeding the dimensions of the rounded shoulder at the head of a carrot, the counter 54 triggers the counter 52 to commence counting of illuminated elements. With the next signal from the master clock source 34 the counter 54 controls the counter 52 so as to count down for the next scan. At the end of a carrot the counter 54 stops further counting of the counter 52 and subsequently resets itself and the counter 52. The up/down counter 52 includes a shift register having two output lines which provide an output indication representation of taper at the last but fourth scan. If the count at the end of taper evaluation is positive then one of the lines will carry a logical 1 and the other a logical 0 whereas if it is positive the two states will be interchanged. Hence the state of the signals on the two lines from the shift register included in the up/down counter 52 indicate whether a carrot is tail first or head first. The purpose of the shift register in the counter is to allow the effect on the count by the last three scans of the count to be ignored.

It will be clear from the description given so far that as a carrot passes the charge coupled device 30, the first signal to appear will be the BOC signal at the output of the AND gate 48, then the appropriate signals will appear on the output lines of counter 52 to indicate the direction in which a carrot is pointing and eventually an EOC signal will appear at the output of the AND gate 50. If the carrot is pointing head first then it will be required to operate the solenoid valve controlling movement of the paddle 10 when the head is aligned with the cutters 7 and 9. If, on the other hand, the carrot is pointing tail first then it will be necessary to actuate the solenoid valve 17 when the end of the carrot is aligned with the cutters 6 and 8. Thus it is not known whether or not a BOC signal will be required until the direction of taper has been determined. It is thus necessary to keep a record of the time of the BOC signal in case it should eventually be required.

It is here mentioned that for a variety of reasons it is not practical to place the photo-sensitive arrangement immediately adjacent the cutting station. It is thus possible for there to be arranged between the cutting station and the light sensitive arrangement more than one carrot and in practice there will typically be as many as three. After sensing and before cutting a record must be maintained of the time of actuation of the paddle member 10 in respect of each of these carrots and for this reason there may need to be more than one register pair for storing this information. In the embodiment described in FIG. 3, three parallel sets of registers 56, 58; 56', 58'; 56", 58"; are utilised to record the occurrence times of the EOC and BOC signals in respect of each carrot. A switch matrix 60 consisting of an arrangement of logic gates is arranged to connect the outputs of the AND gates 48 and 50 as well as the lines from the counter 52 sequentially to the pairs of EOC and BOC registers 56 and 58, the switch matrix 60 being arranged to select the first available empty pair of registers. Assuming that the switch matrix 60 is set to utilize the registers 56 and 58 then when the BOC signal occurs this is entered into the register 56 labelled BOC Register 1. This register may for example be a preset counter or alternatively a shift register. The register 56 is so designed that if the BOC signal corresponds to the head of a carrot then by the time that a signal appears at the output of the register, corresponding perhaps to the counter becoming full or a digit travelling to the last stage of the shift register, the point on the carrot which gave rise to the BOC signal will be aligned with the cutters 7 and 9. Likewise the EOC registers 58 are so designed that the points giving rise to an EOC signal will be aligned with the cutters 6 and 8 when an output appears on these registers. The action of the signals on the outputs of the up/down counter 52 is to render one or other of the registers EOC 1 and BOC 1 inoperative, as for example by resetting the counter or clearing the shift register, as soon as it is realised which way the carrot is pointing. If the carrot is pointing head first then the EOC register is cleared and if the counter is pointing tail-first then the BOC register is cleared. The outputs of all the registers are then connected in parallel to actuate the solenoid valve 17 which is assumed to be inherently capable of actuation by the signals or alternatively to be fitted with suitable interface circuitry.

It has so far been assumed that a predetermined number of pulses from the clock source 34 corresponds to a predetermined displacement of a carrot relative to the cutting station. For this to be true the master clock source 34 must be synchronised with the rotation of the conveyor wheels. The circuit for achieving this is shown in FIG. 4. Coupled to the conveyor wheel are four arms 70 arranged to interrupt the light path between a light source 72 and a photo-detector 74. The photo-detector 74 produces a single pulse, during each 90° rotation of the wheel. The signal from the photo-detector 74 is applied to a discriminator circuit 60 which also receives input from a voltage controlled oscillator circuit 64 by way of a divider 62. If the voltage controlled oscillator 64 is synchronised with the rotation of the wheels, then a predetermined number of pulses will apprear during each 90° rotation. The discrimminator 60 detects any deviation between the actual number of pulses received and the correct number of pulses and controls the voltage controlled oscillator 64 in such a manner as to reduce any errors. By this feedback loop, the frequency at the output of the voltage controlled oscillator 64 is made proportional to the angular velocity of rotation of the wheels 1 and 1'. This does not directly indicate the speed of movement of carrots on both wheels relative to the respective cutting stations since account must also be made of the differing radii in the two cases. For this reason the signal from the oscillator 64 is divided in two separate divider circuits 66 and 68 which are so chosen that the ratio of the output frequencies of these two dividers is the same as the ratio of the two radii of the wheels 1 and 1'. The outputs of the two dividers 66 and 68 serve as the master clock signals for the circuitry associated with the conveyors 1 and 1'.

It will be appreciated that any other form of shaft encoder may be used to replace the four arms 70 and the associated electro-optics.

We claim:

1. In a machine for cutting off the heads of carrots which comprises a cutting station, a conveyor for carrying carrots with random head first or tail first orientation to the cutting station and apparatus operative to sense the orientation of each carrot for controlling the cutting station such as to remove the head of the carrot, the improvement wherein said apparatus operative to sense the direction of orientation of each carrot comprises light sensitive means, a light source for projecting an image of the object on the light sensitive means, means for detecting the leading and trailing edge of each carrot, a circuit connected to the light sensitive means for producing an electrical output signal representative of the proportion of the area of the light sensitive means occupied by the image of the object and means for determining the sense of variation in said electrical output signal as the object is moved past the light sensitive means by the conveyor.

2. A machine according to claim 1, in which the cutting station includes two cutters spaced along the direction of motion of the conveyor, one being operative when the end to be cut is at the leading edge and the other when the trailing edge is to be cut such that the same portion of the carrot is always pushed off the conveyor in between the two cutters, separate chutes being provided to convey the portions of the carrot emitted from between the cutters to a first location and the other portions, emitted from the other sides of the cutters, to a second location.

3. A machine according to claim 1, wherein the conveyor is constituted by the rim of a horizontal wheel rotatable about a vertical axis, the rim being hollowed in such a manner as to inhibit carrots being flung off the conveyor by centrifugal action.

4. A machine according to claim 1, in which the light sensitive means consist of a plurality of discrete photo-sensitive elements, the proportion of the area of the light sensitive means exposed to light being indicated by the number of energized photo-sensitive elements.

5. A machine according to claim 4, wherein the image is a shadow and a scanning circuit is arranged repeatedly to sample sequentially the outputs of the photo-sensitive elements and to count the number of energized elements in each scan starting from a predetermined end and finishing upon reaching a non-energized element, the count being indicative of the proportion of the light sensitive means not shadowed by the object.

6. A machine according to claim 5, in which the means for determining the sense of variation in the count comprise means for adding the counts produced on the first, third and remaining odd numbered scans and subtracting from this calculation the counts on even numbered scans.

7. A machine according to claim 6, in which means are provided for enabling the portions of each carrot a predetermined distance from each end to be disregarded for the purpose of taper detection.

8. A machine according to claim 4, in which means are provided for generating a beginning of carrot signal only when first a point immediately above the conveyor casts a shadow on the light sensitive means.

9. A machine according to claim 1, in which a clock is synchronised to the speed of movement of the conveyor to produce pulses representative of the displacement of the carrots by the conveyor.

10. A machine according to claim 1 comprising two storage means for recording the time of passage of the leading and trailing edge of each carrot past the light sensitive means.

* * * * *